(12) United States Patent
Xie et al.

(10) Patent No.: US 9,712,474 B2
(45) Date of Patent: Jul. 18, 2017

(54) INFORMATION PUSH, RECEIVING AND EXCHANGING METHOD, SERVER, CLIENT AND EXCHANGING APPARATUS

(71) Applicant: Tencent Technology (Shenzhen) Company Limited, Shenzhen (CN)

(72) Inventors: Kai Xie, Shenzhen (CN); Bo Wen, Shenzhen (CN); Xiaoqiang Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 242 days.

(21) Appl. No.: 14/092,787

(22) Filed: Nov. 27, 2013

(65) Prior Publication Data

US 2014/0143359 A1 May 22, 2014

Related U.S. Application Data

(63) Continuation of application No. PCT/CN2013/076471, filed on May 30, 2013.

(30) Foreign Application Priority Data

Nov. 21, 2012 (CN) .......................... 2012 1 0476878

(51) Int. Cl.
*G06F 15/16* (2006.01)
*H04L 12/58* (2006.01)
*H04L 12/18* (2006.01)

(52) U.S. Cl.
CPC .......... *H04L 51/20* (2013.01); *H04L 12/1859* (2013.01)

(58) Field of Classification Search
CPC .......................... H04L 51/20; H04L 12/1859
(Continued)

(56) References Cited

U.S. PATENT DOCUMENTS 9,223,902 B1* 12/2015 McHugh ........... G06F 17/30967
2006/0178115 A1* 8/2006 Vayssiere ............. H04M 11/066
455/90.2

(Continued)

FOREIGN PATENT DOCUMENTS

CN 1863039 A 11/2006
CN 101026634 A 8/2007

(Continued)

OTHER PUBLICATIONS

Wang ("An Industrial-Strength Audio Search Algorithm", ISMIR, 2003).*

(Continued)

*Primary Examiner* — Wing F Chan
*Assistant Examiner* — Joseph Maniwang
(74) *Attorney, Agent, or Firm* — Morgan, Lewis & Bockius LLP

(57) ABSTRACT

A method of providing information to a prospective user is performed at a server having one or more processors and memory storing programs to be executed by the processors, the method including receiving audio feature information and location information from a client device, wherein the audio feature information is extracted from an audio signal received by the client device and the location information identifies a current location of the client device; comparing predefined audio feature information with the received audio feature information and comparing predefined location information with the received location information; and (Continued)

pushing predefined information to the client device from the server if there is a match of both comparisons made at the server.

19 Claims, 16 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2011/0247042 A1* | 10/2011 | Mallinson ......... | G06F 17/30026 725/86 |
| 2012/0029670 A1* | 2/2012 | Mont-Reynaud . | G06F 17/30743 700/94 |
| 2012/0197648 A1* | 8/2012 | Moloney ............... | G10L 19/018 704/500 |
| 2013/0204413 A1* | 8/2013 | Gehani .................. | G11B 27/28 700/94 |

FOREIGN PATENT DOCUMENTS

| | | |
|---|---|---|
| CN | 101354569 A | 1/2009 |
| CN | 101415030 A | 4/2009 |
| CN | 101720058 A | 6/2010 |
| CN | 102387207 A | 3/2012 |
| CN | 102456141 A | 5/2012 |
| CN | 102571374 A | 7/2012 |
| CN | 102710655 A | 10/2012 |
| DE | 102007062817 A1 | 6/2009 |

OTHER PUBLICATIONS

Tencent Technology, ISRWO, PCT/CN2013/076471, Sep. 5, 2013, 9 pgs.

Tencent Technology, IPRP, PCT/CN2013/076471, May 26, 2015, 7 pgs.

* cited by examiner

“INFORMATION PUSH, RECEIVING AND EXCHANGING METHOD, SERVER, CLIENT AND EXCHANGING APPARATUS”

INFORMATION PUSH, RECEIVING AND EXCHANGING METHOD, SERVER, CLIENT AND EXCHANGING APPARATUS

RELATED APPLICATION

This application is a continuation application of PCT Patent Application No. PCT/CN2013/076471, entitled "INFORMATION PUSH, RECEIVING AND EXCHANGING METHOD, SERVER, CLIENT AND EXCHANGING APPARATUS" filed on May 30, 2013, which claims priority to Chinese Patent Application No. 201210476878.3, entitled "INFORMATION PUSH, RECEIVING AND EXCHANGING METHOD, SERVER, CLIENT AND EXCHANGING APPARATUS," filed on Nov. 21, 2012, both of which are incorporated by reference in their entirety.

TECHNICAL FIELD

The disclosed embodiments relate generally to the field of Internet technologies, and in particular, to an information push, receiving and exchanging method, a server, a client device and an information exchanging apparatus.

BACKGROUND

One of the more prevalent commercial aspects of the Internet is that an information distributor may push corresponding information (such as sales promotion advertising and an activity notice) to a user group through various channels. For example, information push is performed through a wired communication network or a wireless communication network such as a mobile phone.

No matter whether the information push is performed by adopting a wired communication network or a wireless communication network, a push server can only ensure that information is effectively pushed to a corresponding user, but cannot ensure whether the corresponding user needs the pushed information or whether it is convenient for the user to use the pushed information. For example, a user is in city A, but receives pushed information of a promotion activity of a supermarket in city B on the same day. Thus, the pushed information is completely useless for the pushed user in city A. For another example, free recreational and sports activities are held in city A, but at this time, a user who resides in city A is on a business trip in city B. Again, the pushed information of the recreational and sports activities is completely useless for the pushed user who is on a business trip in city B. The existing information push service has proven to be inefficient, high in cost, and inaccurate.

Therefore, it is necessary to provide an information push, receiving and exchanging method, a server, a client device and an information exchanging apparatus that may implement accurate and efficient push.

SUMMARY

The objective of the present invention is to provide an information push, receiving and exchanging method, a server, a client device and an information exchanging apparatus to perform an information push according to audio feature information of an audio signal, which may insure an accurate and efficient information push.

Various embodiments of systems, methods and devices within the scope of the appended claims each have several aspects, no single one of which is solely responsible for the attributes described herein. Without limiting the scope of the appended claims, some prominent features are described. After considering this disclosure, and particularly after considering the section entitled "Detailed Description" one will understand how the features of various embodiments enable an accurate and efficient information push to users.

Additional features and advantages of the invention will be set forth in the description that follows, and in part will be apparent from the description, or may be learned by practice of the invention. The objectives and advantages of the invention will be realized and attained by the method that is particularly pointed out in the written description and claims hereof as well as the appended drawings.

To achieve these and other advantages, and in accordance with the purpose of the invention, as embodied and broadly described, the present invention provides a method of providing information to a prospective user performed at a server having one or more processors and memory storing programs to be executed by the processors, the method comprising the steps of receiving audio feature information and location information from a client device, wherein the audio feature information is extracted from an audio signal received by the client device and the location information identifies a current location of the client device; comparing predefined audio feature information with the received audio feature information and comparing predefined location information with the received location information; and pushing predefined information to the client device from the server if there is a match of both comparisons made at the server.

In another embodiment, the predefined audio feature information is extracted from a predefined audio signal scheduled to be broadcasted at a location defined by the predefined location information.

In another embodiment, the predefined audio signal has a frequency ranging from 20 Hz to 10 KHz.

In another embodiment, the predefined audio signal has a frequency ranging from 10 KHz to 40 KHz, or preferably from 20 KHz to 40 KHz.

In another embodiment, the predefined audio signal includes the predefined information pushed to the client device.

In another embodiment, the predefined audio signal is generated by encoding each byte of the predefined information into an audio signal of a predefined fixed frequency band through a table look-up.

In another embodiment, the received audio feature information is generated by decoding the audio signal received by the client device of the predefined fixed frequency band through the table look-up.

In another embodiment, the audio feature information includes one or more sets of values, each set including a timestamp, a frequency, and a volume derived from a respective segment of the audio signal received by the client device.

Another embodiment is a method of retrieving information directed to a user performed at a client device having one or more processors and memory storing programs to be executed by the processors, the method comprising the steps of receiving an audio signal; extracting audio feature information from the received audio signal; sending the audio feature information and location information of the client device to a remote server; receiving information pushed from the server, wherein the received information is chosen by the server based on the audio feature information and the location information; and notifying the user of the received information.

In another embodiment, the client device is located near a broadcasting source and the client device receives the audio signal by recording sounds from the broadcasting source.

In another embodiment, the client device is configured to extract the audio feature information from the received audio signal by: denoising and filtering the received audio signal; and extracting one or more sets of values, each set including a timestamp, a frequency, and a volume, from the denoised and filtered audio signal using a voiceprint recognition algorithm.

In another embodiment, the client device is configured to extract the audio feature information from the received audio signal by: denoising and filtering the received audio signal; and decoding the denoised and filtered audio signal of a predefined fixed frequency band through a table look-up to obtain the audio feature information.

Another embodiment is a server that provides information to a prospective user, comprising one or more processors; memory; and programs stored in the memory and to be executed by the one or more processors, the programs including: receiving audio feature information and location information from a client device, wherein the audio feature information is extracted from an audio signal received by the client device and the location information identifies a current location of the client device; comparing predefined audio feature information with the received audio feature information and comparing predefined location information with the received location information; and pushing predefined information to the client device from the server if there is a match of both comparisons made at the server.

Another embodiment is a client device that retrieves information directed to a prospective user, comprising one or more processors; memory; and programs stored in the memory and to be executed by the one or more processors, the programs including: receiving an audio signal; extracting audio feature information from the received audio signal; sending the audio feature information and location information of the client device to a remote server; receiving information pushed from the server, wherein the received information is chosen by the server based on the audio feature information and the location information; and notifying the user of the received information.

In another embodiment, the broadcasting position and the location information comprise at least one of a GPS reading, a time stamp, a volume of the predefined audio signal, and a frequency of the predefined audio signal.

Compared with the prior art, in the information push, receiving and exchanging method, the server, the client device and the information exchanging apparatus of the present invention, information push is performed according to the audio feature information of the audio signal, which may implement accurate and efficient information push, improve the information push efficiency, and solve the technical problem that the existing information push service is low in efficiency, high in cost, and cannot implement accurate push of information.

To make the foregoing content of the present invention clear and comprehensible, exemplary embodiments are taken in the following with reference to the accompanying drawings for detailed descriptions.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
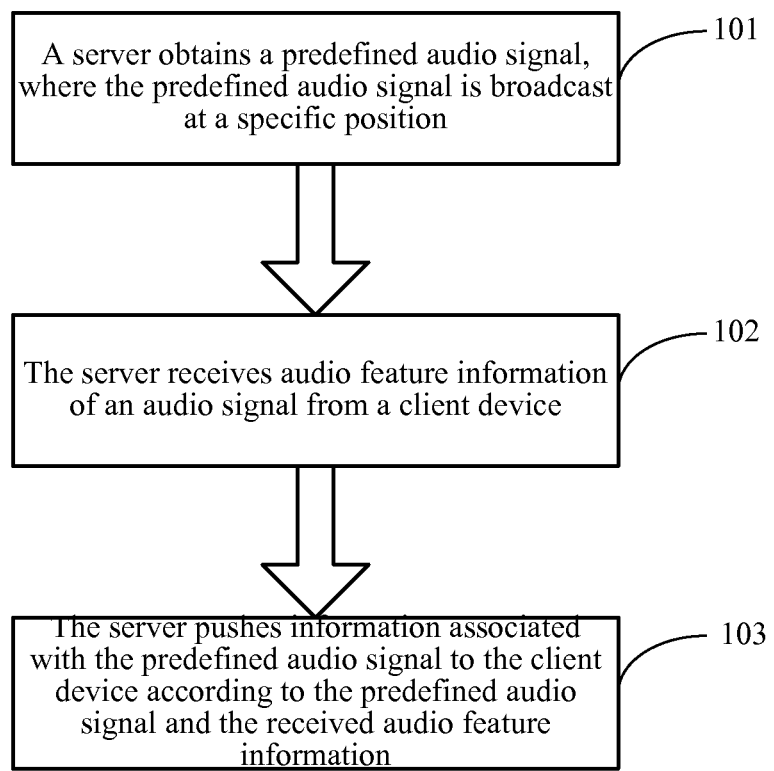
FIG. 1 is a flow chart of a first exemplary embodiment of an information push method according to the present invention.

Embodiments in the following are described with reference to the accompanying drawings, so as to exemplify specific embodiments that the present invention may use for embodiments. Directional terms mentioned in the present invention, such as "up", "down", "front", "back", "left", "right", "inner", "outer", "side", are only directions with reference to the accompanying drawings. Therefore, the directional terms are merely used for describing and understanding the present invention, instead of limiting the present invention.

In the drawings, units with a similar structure are denoted by the same reference numerals.

FIG. 1 is a flow chart of a first exemplary embodiment of an information push method according to the present invention.

In step 101, a server obtains a predefined audio signal, where the predefined audio signal is broadcast at a specific position. In step 102, the server receives audio feature information of an audio signal from a client device. In step 103, the server pushes to the client device information associated with the predefined audio signal according to the predefined audio signal and the received audio feature information.

In the information push method of this exemplary embodiment, according to the audio feature information of the audio signal, the information associated with the predefined audio signal is pushed to a user located at a specific position where the predefined audio signal is broadcast. This enables an information push to a user at a specific position, improves the information push accuracy and efficiency, and reduces the information push cost.

Moreover, the sequences of the steps in this exemplary embodiment do not limit the protection scope of the present invention. For example, the technical solutions of the present invention may also be implemented by performing Step 102 before Step 101. Therefore, the steps of the present invention can be performed in other sequences to achieve the technical effect of improving the information push efficiency, which also falls in the protection scope of the present invention.

Figure 2:
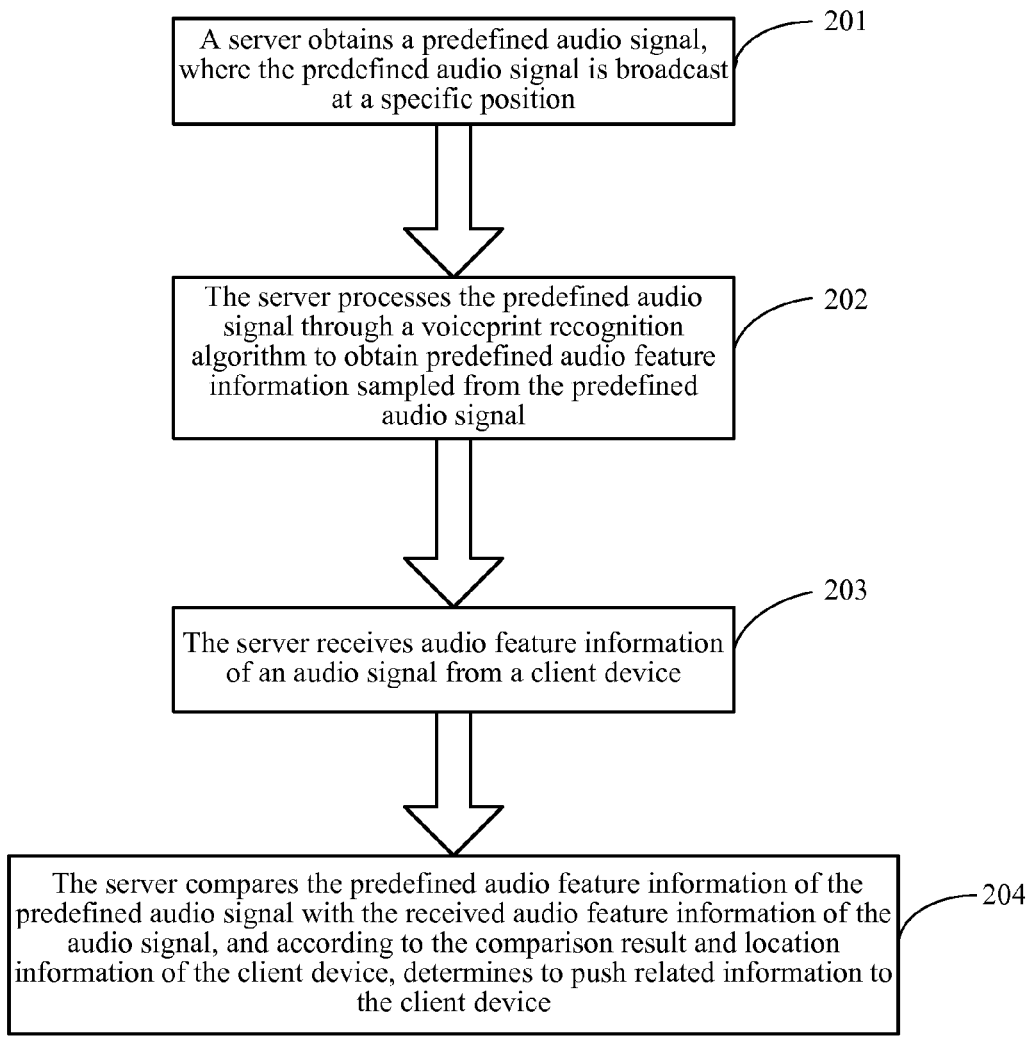
FIG. 2 is a flow chart of a second exemplary embodiment of the information push method according to the present invention.

If the predefined audio signal broadcast at the specific position is a low-frequency audio signal, refer to FIG. 2. FIG. 2 is a flow chart of a second exemplary embodiment of the information push method according to the present invention.

In step 201, a server obtains a predefined audio signal, where the predefined audio signal is broadcast at a specific position. Step 202 illustrates that the server processes the predefined audio signal through a voiceprint recognition algorithm to obtain predefined audio feature information sampled from the predefined audio signal. In step 203, the server receives audio feature information of a client device on an audio signal. In step 204, the server compares the predefined audio feature information of the predefined audio signal with the audio feature information of the audio signal, and according to the comparison result and location information of the client device, determines to push related information to the client device.

In this particular embodiment, the predefined audio signal has a frequency ranging from 20 Hz to 10 KHz, which is an audio range of a common musical instrument. The frequency band may use common human voice, music and natural sounds such as tweet as a transmission medium.

In Step 201, the predefined audio signal is broadcast at a specific position (a specified cafe, park, mall, and so on) where information is to be pushed, and the predefined audio signal is obtained.

In Step 202, the predefined audio feature information of the predefined audio signal is obtained by processing the predefined audio signal through a voiceprint recognition algorithm. A voiceprint recognition algorithm may perform periodic sampling on the predefined audio signal to obtain sampled sound anchor points of the predefined audio signal. For example, three anchor points are sampled per second, including feature values such as a timestamp, a frequency and a volume, which are audio feature information of the predefined audio signal.

In Step 203, a client device located in a surrounding area of the specific position receives an audio signal having a frequency range of the surrounding area (generally, an area centered on the client device and having a radius of 50 meters). This frequency range may be a low-frequency audio signal. The client device denoises and filters the received audio signal, then processes the denoised and filtered audio signal through the above voiceprint recognition algorithm to obtain the audio feature information of the audio signal, and sends the audio feature information of the audio signal to the server. The server receives the audio feature information of the audio signal received by the client device.

In Step 204, the predefined audio feature information of the predefined audio signal and the audio feature information of the audio signal received by the client device are received. The audio feature information of the predefined audio signal is compared with the audio feature information of the audio signal received by the client device. If the predefined audio feature information of the predefined audio signal is matched with the audio feature information, and at the same time, the server determines that the location of the client device is located in the surrounding area of the specific position, then the information associated with the predefined audio signal (namely, related information) is pushed to the client device.

When the sampled sound anchor points of the predefined audio signal are continuously compared with the sampled sound anchor points of the audio feature information, and the feature values of the sampled sound anchor points of the predefined audio signal are continuously matched with the feature values of the sampled sound anchor points of the audio feature information and reach a certain confidence interval, the audio features sampled from the predefined audio signal are matched with the audio feature information.

If the audio features sampled from the predefined audio signal do not match the audio feature information, or the client device is not located within the surrounding area of the specific position, no information is pushed to the client device.

In the information push method of this exemplary embodiment, information is pushed to the user by detecting the predefined audio feature information of the predefined audio signal and the audio feature information of the audio signal, which improves the information push accuracy and efficiency. At the same time, the location of the client device is judged, which further decreases information push errors. The range (namely, surrounding area) of the information to be pushed is determined according to the power of an information push source and the receiving situation of the client device, and is generally set as a range centered on the information push source and with a radius of 50 meters.

Figure 3:
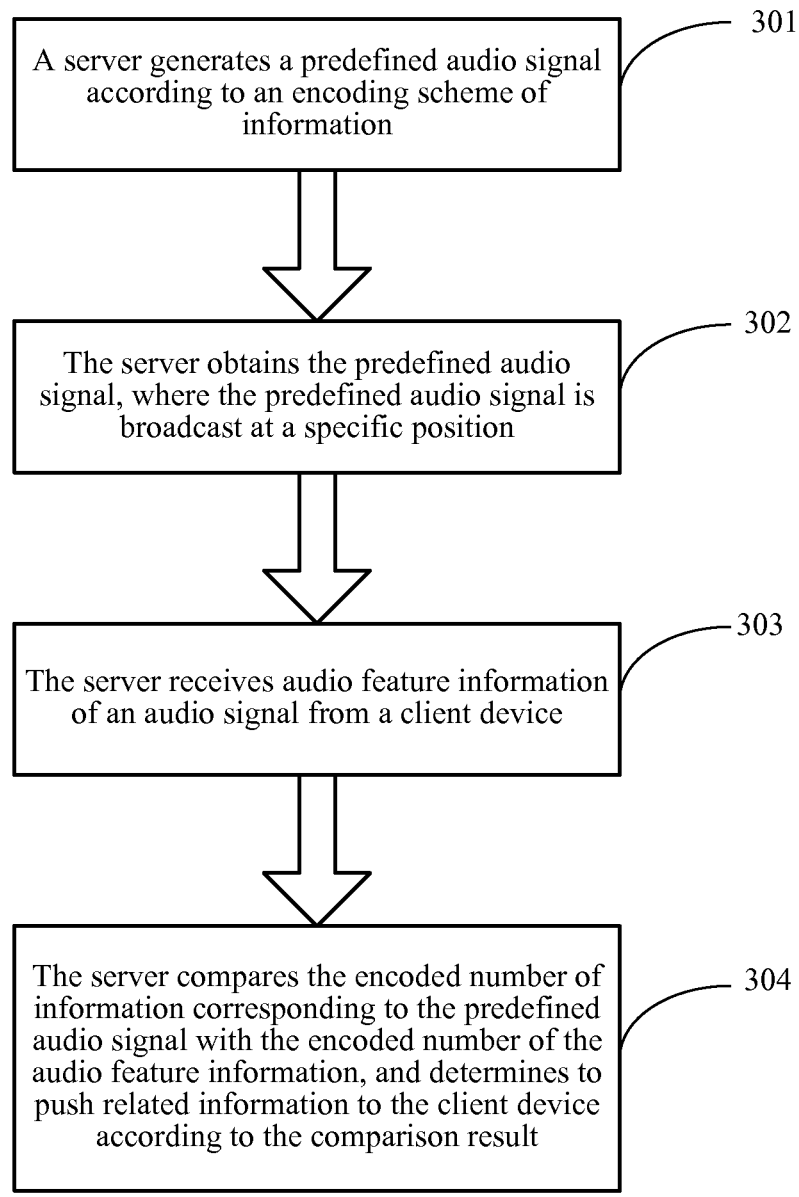
FIG. 3 is a flow chart of a third exemplary embodiment of the information push method according to the present invention.

FIG. 3 is a flow chart of a third exemplary embodiment of the information push method according to the present invention in which the predefined audio signal broadcast at the specific position is a high-frequency audio signal.

Step 301 illustrates that a server generates a predefined audio signal according to the encoding scheme of information.

In step 302, the server obtains the predefined audio signal, where the predefined audio signal is broadcast at a specific position.

In step 303, the server receives audio feature information of a client device on an audio signal.

Finally, in step 304, the server compares the information associated with the predefined audio signal with the decoded audio feature information, and determines to push related information to the client device according to the comparison result.

In the particular embodiment, the frequency range of the high-frequency audio signal is 10 KHz to 40 KHz. Music and a human voice barely reach this audio range, so interference is low. Accordingly, the accuracy of audio feature information of the audio signal in this frequency range may be improved by means of table look-up, encoding or other manners known to those skilled in the art. To be compatible with a sampling rate of most of the existing mobile phone handsets, the frequency range of the high-frequency audio signal preferably may be set to 10 KHz to 20 KHz. The adopted high-frequency audio signal is generated through table look-up and encoding; thus the audibility of the high-frequency audio signal is low. To make the signal completely inaudible to human ears (namely, to completely eliminate the effect of the high-frequency audio signal on human ears), the frequency range of the high-frequency audio signal preferably may be set to 20 KHz to 40 KHz. Music and human voice are basically unable to reach the frequency range of 20 KHz to 40 KHz, and the sound in this frequency range is inaudible to human ears.

In Step 301, the predefined audio signal is generated according to the encoding scheme of the information. In this exemplary embodiment, since the predefined audio signal is a high-frequency audio signal, the sound is inaudible to or basically inaudible to human ears, and the anti-interference capability is strong (the interference sound in this frequency band is low), the information to be pushed may be encoded to facilitate the generation and broadcasting of the predefined audio signal. The encoding scheme may be generated by any method, such as random encoding or sequential encoding, as long as it can be ensured that there is a one-to-one correspondence between the encoded information and the information to be pushed. Thus, the predefined audio signal may be generated directly through encoding the information, without worrying the audibility of the predefined audio signal.

An audio signal of a predefined fixed frequency band may be used through table look-up to denote each byte of the encoded information, so as to generate the predefined audio signal.

To simplify the encoding of the information, the encoded information may also be encoded according to a simplified encoding algorithm to obtain an encoded number, and the audio signal of the predefined fixed frequency band is used through table look-up to denote each byte of the encoded number, so as to generate the predefined audio signal. Any simplified encoding algorithm that may simplify the encoded number of the information may be used. Accordingly, the difference of the simplified encoding algorithm does not limit the protection scope of the present invention.

In Step 302, the predefined audio signal is broadcast at a specific position where information is to be pushed, and the predefined audio signal is obtained.

In Step 303, a client device located in a surrounding area of the specific position receives a surrounding high-frequency audio signal (low predefined audio signal described above), and denoises and filters the received high-frequency audio signal, then processes the denoised and filtered audio signal through the above table look-up to obtain the audio feature information of the audio signal, and sends the audio feature information of the audio signal to the server. The server receives the audio feature information of the audio signal received by the client device.

In Step 304, the encoded number of the information associated with the predefined audio signal and the audio feature information of the audio signal received by the client device are received by the server, and the encoded number of the information associated with the predefined audio signal is compared with the encoded number of the audio feature information.

If in Step 301, the predefined audio signal is generated only through table look-up, the audio feature information on the audio signal is equivalent to the encoded number of the audio feature information, and the encoded number of the information associated with the predefined audio signal is compared with the encoded number of the audio feature information. If, on the other hand, in Step 301, the predefined audio signal is generated by means of encoding and table look-up, the audio feature information on the audio signal is decoded according to the simplified encoding algorithm to obtain the audio feature information, and then the encoded number of the information associated with the predefined audio signal is compared with the encoded number of the audio feature information.

If the encoded number of the information associated with the predefined audio signal matches the encoded number of the audio feature information, the information associated with the predefined audio signal is pushed to the client device.

When the encoded number of the information associated with the predefined audio signal is completely consistent with the encoded number of the audio feature information, the encoded number of the information associated with the predefined audio signal is matched with the encoded number of the audio feature information.

If the encoded number of the information associated with the predefined audio signal does not match the encoded number of the audio feature information, no information is pushed to the client device.

In this way, the information push process of this exemplary embodiment is completed. In the information push method of this exemplary embodiment, information is pushed to the user by detecting the encoded number of the audio feature information on the audio signal. The anti-interference capability of the audio signal in the frequency range is strong, and the correspondence between the encoded number of the audio feature information and the pushed information is strong. Accordingly, the information push accuracy and efficiency are further improved. The range of the information to be pushed also is determined according to the power of an information push source and the receiving situation of the client device. Moreover, since the high-frequency audio signal is inaudible to human ears, the information push range may be enlarged by increasing the frequency of the information push source. The push range is generally set as a range centered on the information push source and with a radius of 100 meters.

Figure 4:
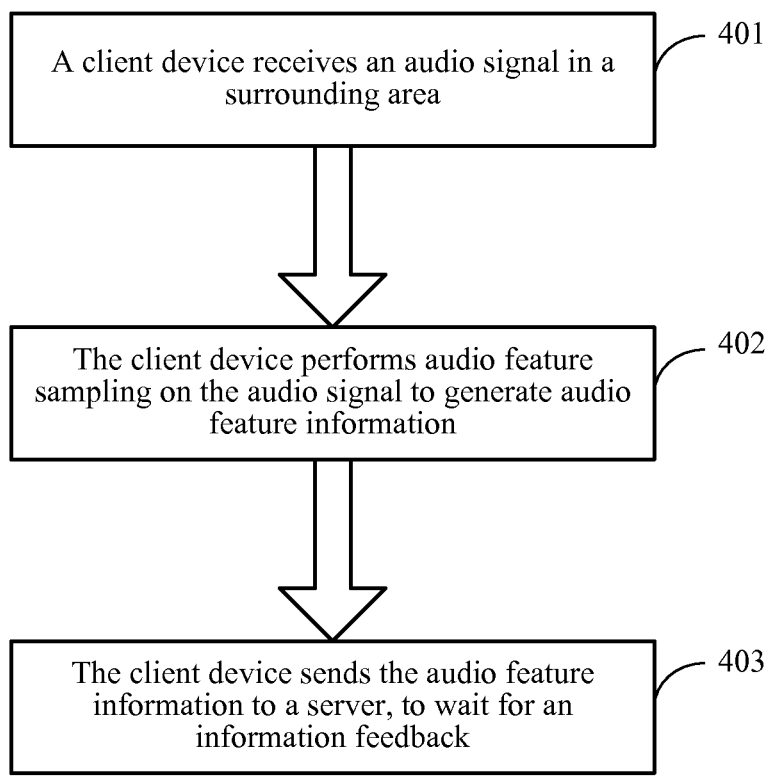
FIG. 4 is a flow chart of a first exemplary embodiment of an information receiving method according to the present invention.

FIG. 4 is a flow chart of a first exemplary embodiment of the information receiving method according to the present invention.

In step 401, a client device receives an audio signal in a surrounding area. In step 402, the client device performs audio feature sampling on the audio signal to generate audio feature information. In step 403, the client device sends the audio feature information to a server, to wait for an information feedback.

In the information receiving method of this exemplary embodiment, the judgment of the server on the audio feature information is the same as or similar to the descriptions of the first exemplary embodiment of the above information push method. Reference is specifically made to related descriptions of the first exemplary embodiment of the above information push method.

In the information receiving method of this exemplary embodiment, the audio feature information of the audio signal is sent to the server to locate the client device, so that the server pushes information associated with the predefined audio signal to the user located at a specific position where the predefined audio signal is broadcast, which implements information push to a user at a specific position, improves the information push accuracy and efficiency, and reduces the information push cost.

Figure 5:
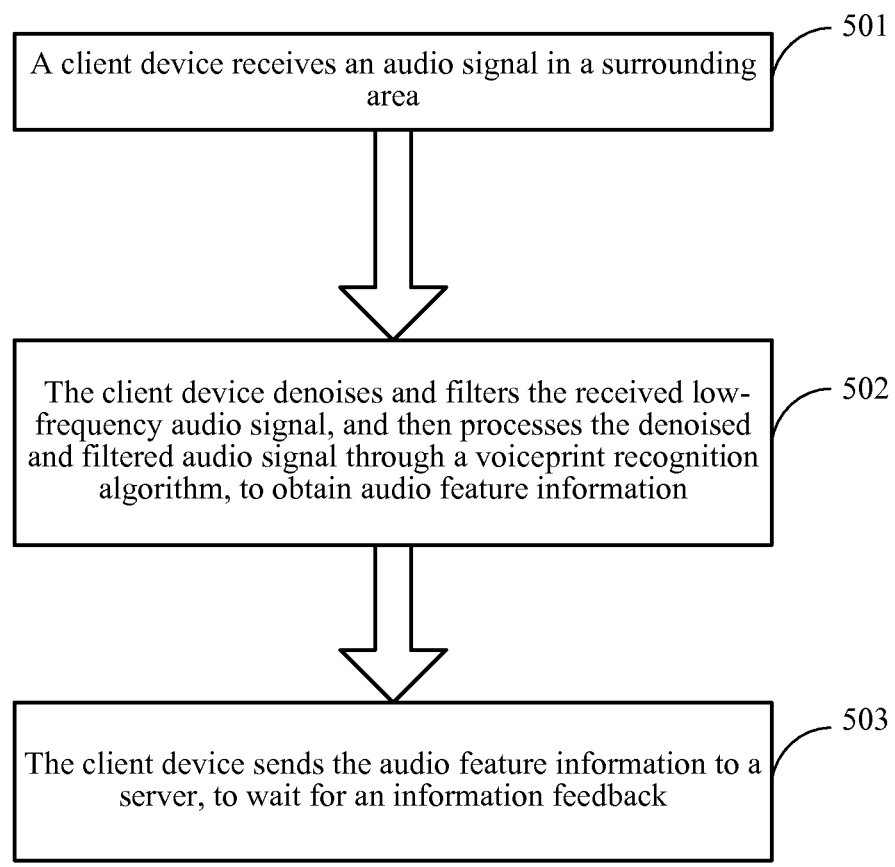
FIG. 5 is a flow chart of a second exemplary embodiment of the information receiving method according to the present invention.

FIG. 5 is a flow chart of a second exemplary embodiment of the information receiving method according to the present invention when the received signal is a low-frequency audio signal in the surrounding area.

In step 501, a client device receives an audio signal in a surrounding area. In step 502, the client device denoises and filters the received low-frequency audio signal, and then processes the denoised and filtered audio signal through a voiceprint recognition algorithm, to obtain audio feature information. In step 503, the client device sends the audio feature information to a server, to wait for an information feedback.

When the information receiving method of this exemplary embodiment is used, a low-frequency audio signal in a surrounding area is received; the received low-frequency audio signal is then denoised and filtered, and the denoised and filtered audio signal is processed through the voiceprint recognition algorithm, to obtain the audio feature information. Finally, the audio feature information is sent to the server. If, after judging the audio feature information, the server determines to push information to a corresponding client device, the pushed information is received.

In this way, the information receiving process of this exemplary embodiment is completed. In the information receiving method of this exemplary embodiment, the judgment of the server on the audio feature information is the same as or similar to the descriptions of the second exemplary embodiment of the above information push method, and reference is specifically made to related descriptions of the second exemplary embodiment of the above information push method.

In the information receiving method of this exemplary embodiment, the low-frequency audio signal in the surrounding area is analyzed through the voiceprint recognition algorithm, and the corresponding audio feature information is sent to the server, which implements information push of the server to a user at a specific position, improves the information push accuracy and efficiency, and reduces the information push cost.

Figure 6:
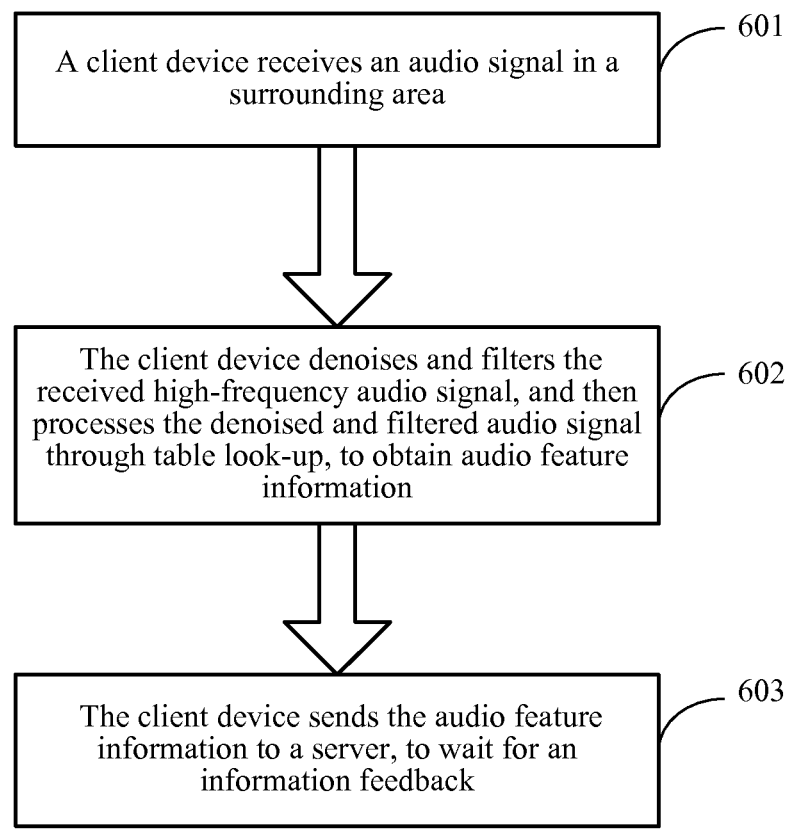
FIG. 6 is a flow chart of a third exemplary embodiment of the information receiving method according to the present invention.

FIG. 6 is a flow chart of a third exemplary embodiment of the information receiving method according to the present invention when the received audio signal is a high-frequency audio signal in the surrounding area.

In step 601, a client device receives an audio signal in a surrounding area. In step 602, the client device denoises and filters the received high-frequency audio signal, and then processes the denoised and filtered audio signal through table look-up, to obtain audio feature information. In step 603, the client device sends the audio feature information to a server, to wait for an information feedback.

When the information receiving method of this exemplary embodiment is used, the high-frequency audio signal in the surrounding area is received; the received high-frequency audio signal is then denoised and filtered, and the denoised and filtered audio signal is processed through table look-up, to obtain the audio feature information. Finally, the audio feature information is sent to the server. If, after judging the audio feature information, the server determines to push information to a corresponding client device, the pushed information is received.

In this way, the information receiving process of this exemplary embodiment is completed. In the information receiving method of this exemplary embodiment, the judgment of the server on the audio feature information is the same as or similar to the descriptions of the third exemplary embodiment of the above information push method, and reference is specifically made to related descriptions of the third exemplary embodiment of the above information push method.

In the information receiving method of this exemplary embodiment, the high-frequency audio signal in the surrounding area is analyzed by the method of table look-up, and the corresponding audio feature information is sent to the server, which implements an information push of an information push server to a user at a specific position, improves the information push accuracy and efficiency, and reduces the information push cost.

Figure 7:
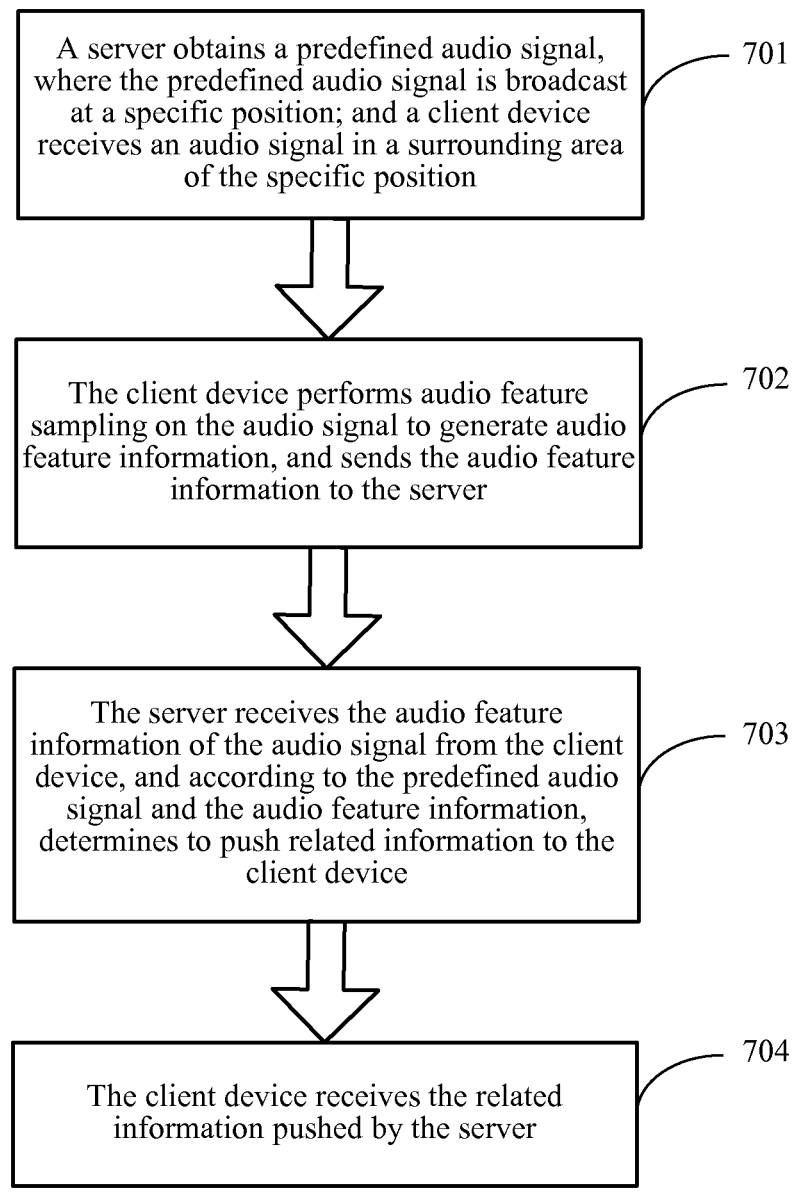
FIG. 7 is a flow chart of a first exemplary embodiment of an information exchanging method according to the present invention.

FIG. 7 is a flow chart of a first exemplary embodiment of an information exchanging method according to the present invention.

In step 701, a server obtains a predefined audio signal, where the predefined audio signal is broadcast at a specific position; and a client device receives an audio signal in a surrounding area of the specific position. In step 702, the client device performs audio feature sampling on the audio signal to generate audio feature information, and sends the audio feature information to the server. In step 703, the server receives the audio feature information of the audio signal received by the client device, and according to the predefined audio signal and the audio feature information, determines to push related information to the client device. In step 704, the client device receives the related information pushed by the server.

In the information exchanging method of this exemplary embodiment, the client device sends the audio feature information of the audio signal to the server, and the server pushes information associated with the predefined audio signal to a user located at a specific position where the predefined audio signal is broadcast according to the audio feature information of the audio signal, which implements information exchanging of a user at a specific position, improves the information exchanging accuracy and efficiency, and reduces the information exchanging cost.

Figure 8:
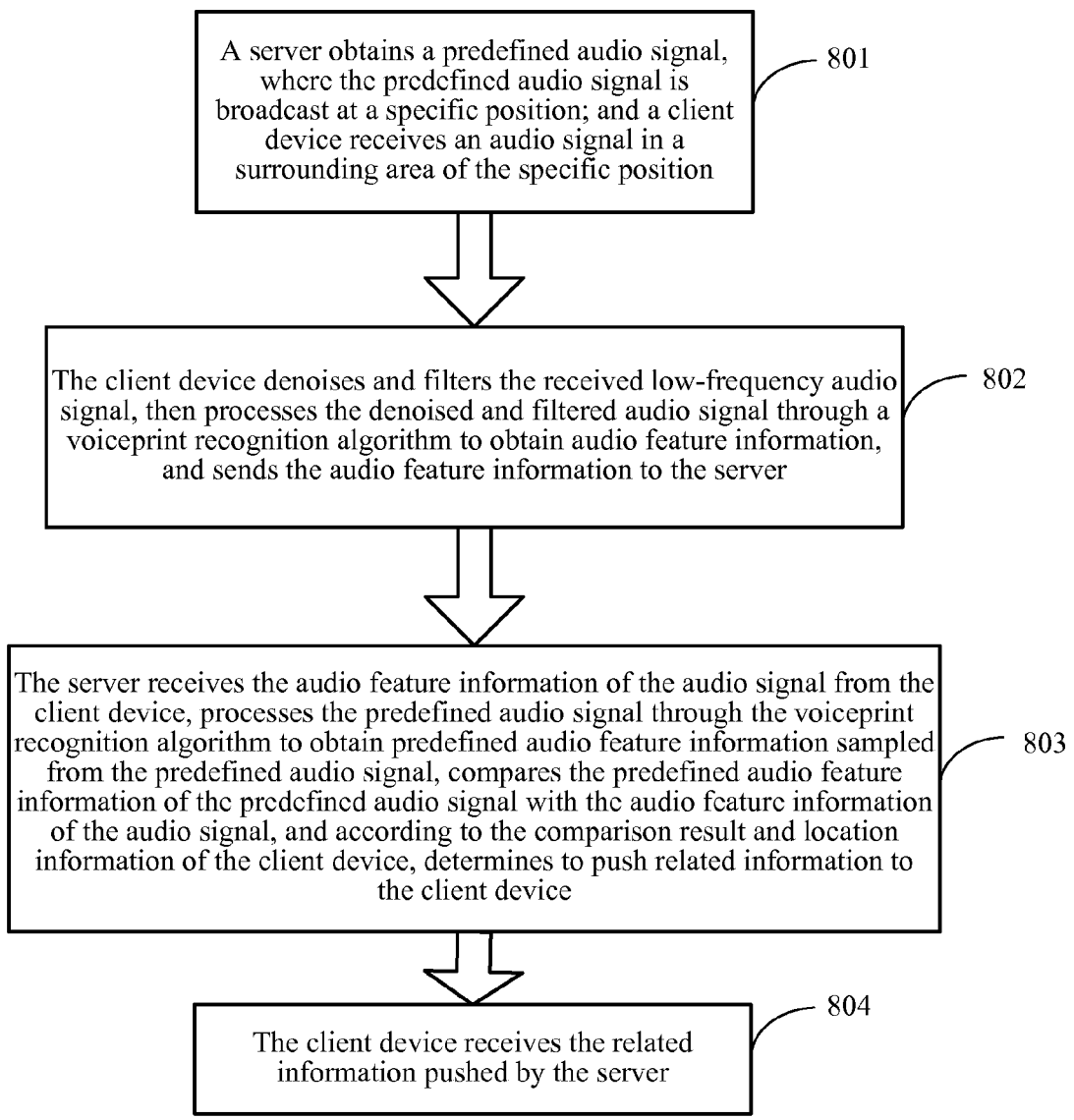
FIG. 8 is a flow chart of a second exemplary embodiment of the information exchanging method according to the present invention.

FIG. 8 is a flow chart of a second exemplary embodiment of the information exchanging method according to the present invention when the predefined audio signal broadcast by the server at the specific position and the audio signal received by the client device in the surrounding area are low-frequency audio signals.

In step 801, a server obtains a predefined audio signal, where the predefined audio signal is broadcast at a specific position; and a client device receives an audio signal in a surrounding area of the specific position.

In step 802, the client device denoises and filters the received low-frequency audio signal, then processes the denoised and filtered audio signal through a voiceprint recognition algorithm to obtain audio feature information, and sends the audio feature information to the server.

In step 803, the server receives the audio feature information of the audio signal received by the client device, processes the predefined audio signal through the voiceprint recognition algorithm to obtain predefined audio feature information sampled from the predefined audio signal, compares the predefined audio feature information of the predefined audio signal with the audio feature information of the audio signal, and according to the comparison result and location information of the client device, determines to push related information to the client device.

In step 804, the client device receives the related information pushed by the server.

The specific use procedure of the information exchanging method of this exemplary embodiment is the same as or similar to the descriptions of the second exemplary embodiment of the above information push method and the second exemplary embodiment of the information receiving method. Reference is specifically made to the descriptions of the second exemplary embodiment of the above information push method and the second exemplary embodiment of the information receiving method.

In the information exchanging method of this exemplary embodiment, the server performs information exchanging with the user by detecting the predefined audio feature information of the predefined audio signal and the audio feature information of the audio signal, which improves the information exchanging accuracy and efficiency. At the same time, the location of the client device is judged, which further decreases information exchanging errors.

Figure 9:
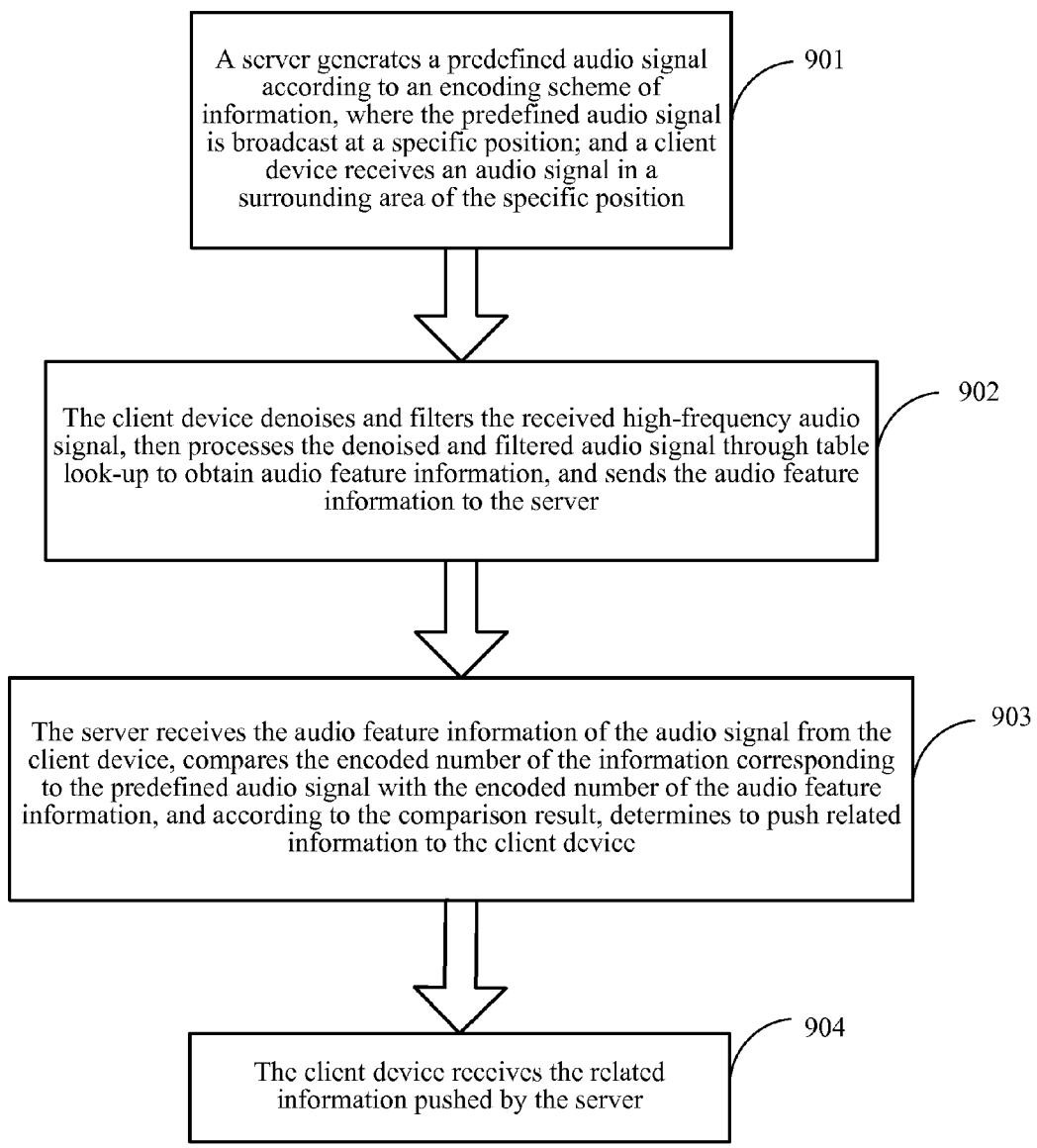
FIG. 9 is a flow chart of a third exemplary embodiment of the information exchanging method according to the present invention.

FIG. 9 is a flow chart of a third exemplary embodiment of the information exchanging method according to the present invention when the predefined audio signal broadcast by the server at the specific position and the audio signal received by the client device in the surrounding area are high-frequency audio signals.

In step 901, a server generates a predefined audio signal according to an encoding scheme of information, where the predefined audio signal is broadcast at a specific position; and a client device receives an audio signal in a surrounding area of the specific position. In step 902, the client device denoises and filters the received high-frequency audio signal, then processes the denoised and filtered audio signal through table look-up to obtain audio feature information, and sends the audio feature information to the server. In step 903, the server receives the audio feature information of the audio signal received by the client device, compares the encoded number of the information associated with the predefined audio signal with the encoded number of the audio feature information, and according to the comparison result, determines to push related information to the client device. In step 904, the client device receives the related information pushed by the server.

The specific use procedure of the information exchanging method of this exemplary embodiment is the same as or similar to the descriptions of the third exemplary embodiment of the above information push method and the third exemplary embodiment of the information receiving method. Reference is specifically made to the descriptions of the third exemplary embodiment of the above information push method and the third exemplary embodiment of the information receiving method.

In the information exchanging method of this exemplary embodiment, the server performs information exchanging with the user by detecting the predefined audio feature information of the predefined audio signal and the audio feature information of the audio signal. The anti-interference capability of the audio signal in the frequency range is strong, and the correspondence between the encoded number of the audio feature information and the pushed information is strong, which further improves the information exchanging accuracy and efficiency.

Figure 10:
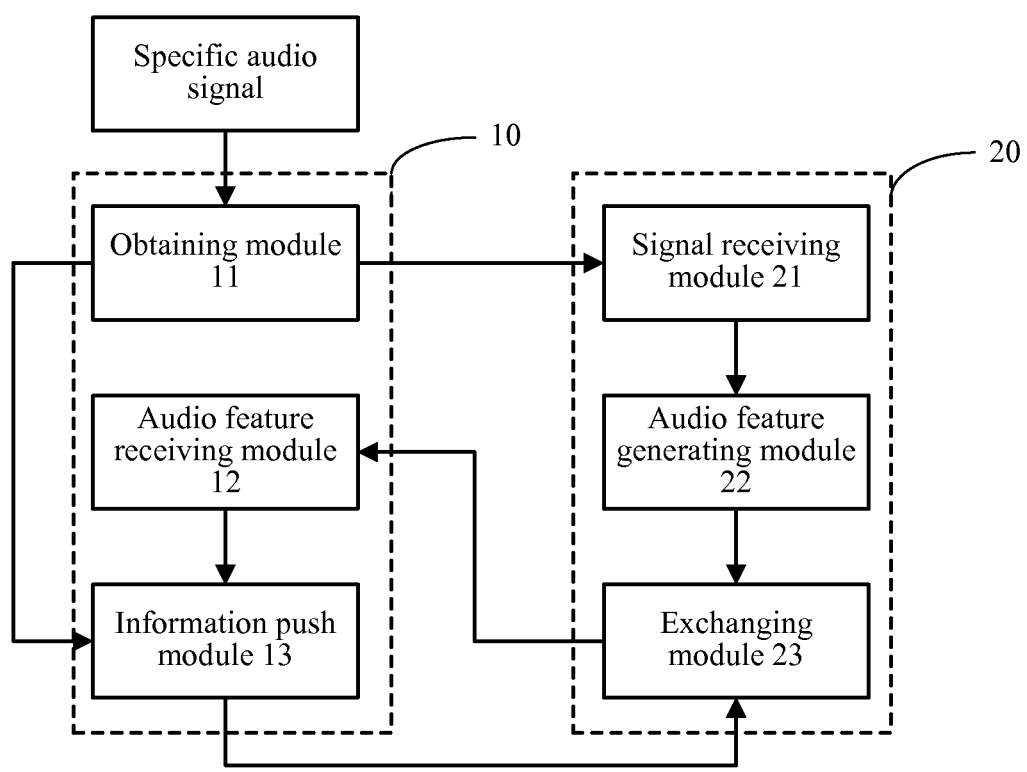
FIG. 10 is a schematic structural diagram of a first exemplary embodiment of an information exchanging apparatus, a server and a client device according to the present invention.

FIG. 10 is a schematic structural diagram of a first exemplary embodiment of an information exchanging apparatus, a server and a client device according to the present invention. The information exchanging apparatus of this exemplary embodiment includes a server 10 and a client device 20. The server 10 includes an obtaining module 11, an audio feature receiving module 12 and an information push module 13. The client device 20 includes a signal receiving module 21, an audio feature generating module 22 and an exchanging module 23.

The obtaining module 11 is configured to obtain a predefined audio signal, where the predefined audio signal is broadcast at a specific position. The audio feature receiving module 12 is configured to receive audio feature information of the client device 20 on an audio signal. The information push module 13 is configured to determine to push information associated with the predefined audio signal to the client device 20 according to the predefined audio signal and the audio feature information.

The signal receiving module 21 is configured to receive an audio signal in a surrounding area. The audio feature generating module 22 is configured to perform audio feature sampling on the audio signal to generate the audio feature information. The exchanging module 23 is configured to send the audio feature information to the server 10, so as to receive corresponding information.

When the information exchanging apparatus of this exemplary embodiment is used, the obtaining module 11 of the server 10 first obtains a predefined audio signal, where the predefined audio signal is broadcast at a specific position; the signal receiving module 21 of the client device 20 receives an audio signal in a surrounding area that includes the predefined audio signal; the audio feature generating module 22 of the client device 20 performs audio feature sampling on the received audio signal to generate audio feature information; and the exchanging module 23 of the client device 20 sends the audio feature information to the server 10. The audio feature receiving module 12 of the server 10 receives the audio feature information of the client device 20 on the audio signal; and at the same time, the information push module 13 of the server 10 determines to push information associated with the predefined audio signal to the client device 20 according to the predefined audio signal and the audio feature information.

The specific working principles of the server 10 and the client device 20 of the information exchanging apparatus of this exemplary embodiment are the same as or similar to the descriptions of the first exemplary embodiment of the above information push method and the first exemplary embodiment of the information receiving method. Reference is specifically made to related descriptions of the first exemplary embodiment of the above information push method and the first exemplary embodiment of the information receiving method.

Figure 11:
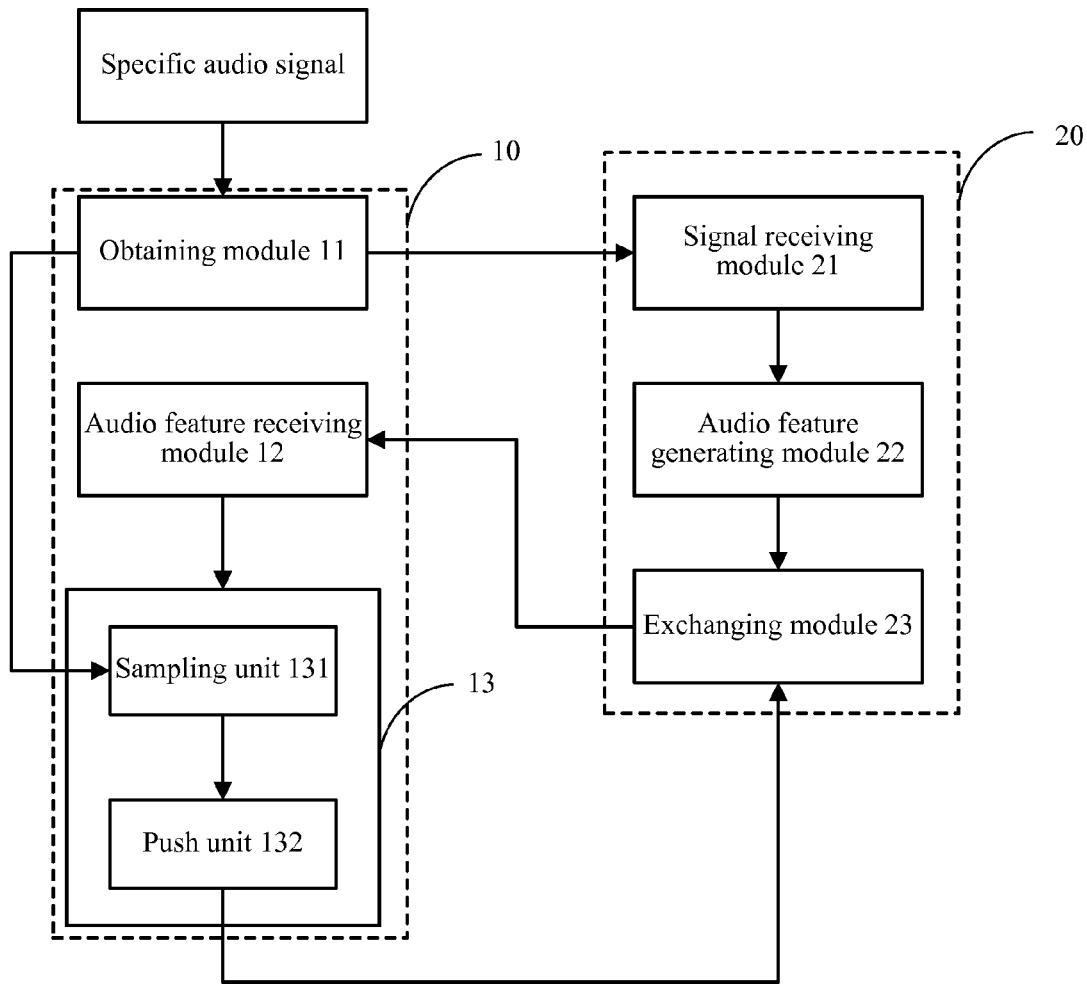
FIG. 11 is a schematic structural diagram of a second exemplary embodiment of the information exchanging apparatus, the server and the client device according to the present invention.

FIG. 11 is a schematic structural diagram of a second exemplary embodiment of the information exchanging apparatus, the server and the client device according to the present invention. In this exemplary embodiment, the obtaining module 11 of the server 10 obtains a predefined audio signal, where the predefined audio signal is broadcast at a specific position, the predefined audio signal is a low-frequency audio signal, and the predefined audio signal has a frequency ranging from 20 Hz to 10 KHz. The signal receiving module 21 receives the low-frequency audio signal in the surrounding area, and the audio feature generating module 22 denoises and filters the low-frequency audio signal received by the signal receiving module 21 and processes the denoised and filtered audio signal through a voiceprint recognition algorithm to obtain audio feature information.

The information push module 13 includes a sampling unit 131 and a push unit 132. The sampling unit 131 is configured to process the predefined audio signal through the voiceprint recognition algorithm to obtain predefined audio feature information sampled from the predefined audio signal. The push unit 132 is configured to push information associated with the predefined audio signal to the client device 20, if the predefined audio feature information of the predefined audio signal is matched with the audio feature information and the location of the client device 20 is located in a surrounding area of the specific position.

The specific working principles of the server 10 and the client device 20 of the information exchanging apparatus of this exemplary embodiment are the same as or similar to the descriptions of the second exemplary embodiment of the above information push method and the second exemplary embodiment of the information receiving method. Reference is specifically made to related descriptions of the second exemplary embodiment of the above information push method and the second exemplary embodiment of the information receiving method.

Figure 12:
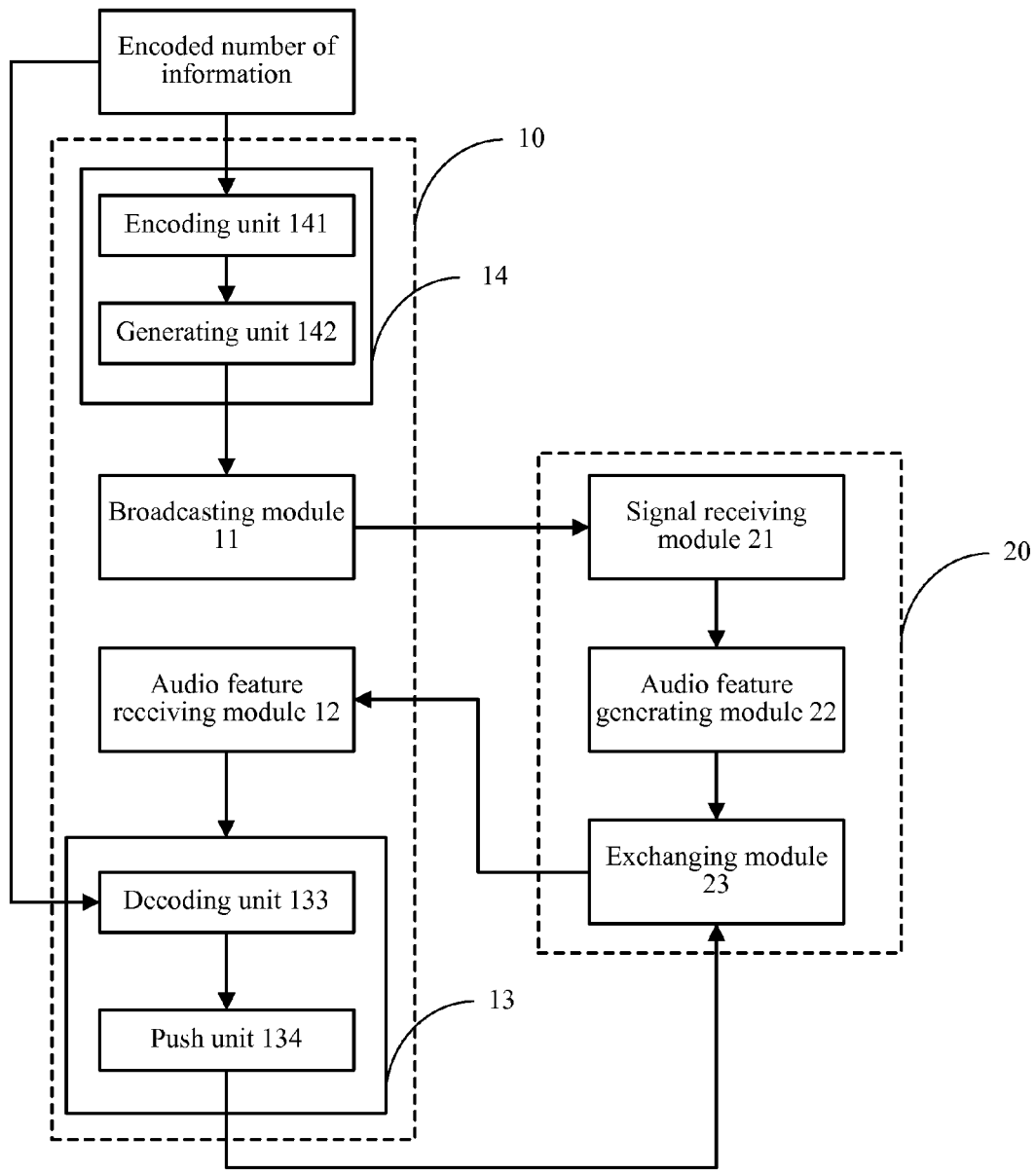
FIG. 12 is a schematic structural diagram of a third exemplary embodiment of the information exchanging apparatus, the server and the client device according to the present invention.

FIG. 12 is a schematic structural diagram of a third exemplary embodiment of the information exchanging apparatus, the server and the client device according to the present invention. In this exemplary embodiment, information to be pushed is first numbered to facilitate the generation and broadcasting of the predefined audio signal. The server 10 further may include an audio information generating module 14, where the audio information generating module 14 directly uses an audio signal of a predefined fixed frequency band through table look-up to denote each byte of the information, so as to generate the predefined audio signal. The server may also include an encoding unit 141 and a generating unit 142, where the encoding unit 141 is configured to encode the information according to a simplified encoding algorithm to obtain an encoded number, and the generating unit 142 is configured to use the audio signal of the predefined fixed frequency band through table look-up to denote each byte of the encoded number, so as to generate the predefined audio signal.

The obtaining module 11 of the server 10 obtains the predefined audio signal, where the predefined audio signal is broadcast at a specific position, the predefined audio signal is a high-frequency audio signal, and the frequency range of the high-frequency audio signal is 10 KHz to 40 KHz. To make the signal completely inaudible to human ears, the frequency range may be preferably set to 20 KHz to 40 KHz.

The signal receiving module 21 receives a high-frequency audio signal in a surrounding area, and the audio feature generating module 22 denoises and filters the high-frequency audio signal received by the signal receiving module 21 and processes the denoised and filtered audio signal through table look-up to obtain audio feature information.

The information push module 13 may include a decoding unit 133 and a push unit 134. The decoding unit 133 is configured to decode the audio feature information according to a simplified encoding algorithm to obtain an encoded number. The push unit 134 is configured, if the encoded number of the information associated with the predefined audio signal is matched with the encoded number of the audio feature information, to push the information associated with the predefined audio signal to the client device 20.

If the audio information generating module 14 directly generates the predefined audio signal through table look-up, the decoding unit 133 may not be set.

The specific working principles of the server 10 and the client device 20 of the information exchanging apparatus of this exemplary embodiment are the same as or similar to the descriptions of the third exemplary embodiment of the above information push method and the third exemplary embodiment of the information receiving method. Reference is specifically made to related descriptions of the third exemplary embodiment of the above information push method and the third exemplary embodiment of the information receiving method.

Figure 13:
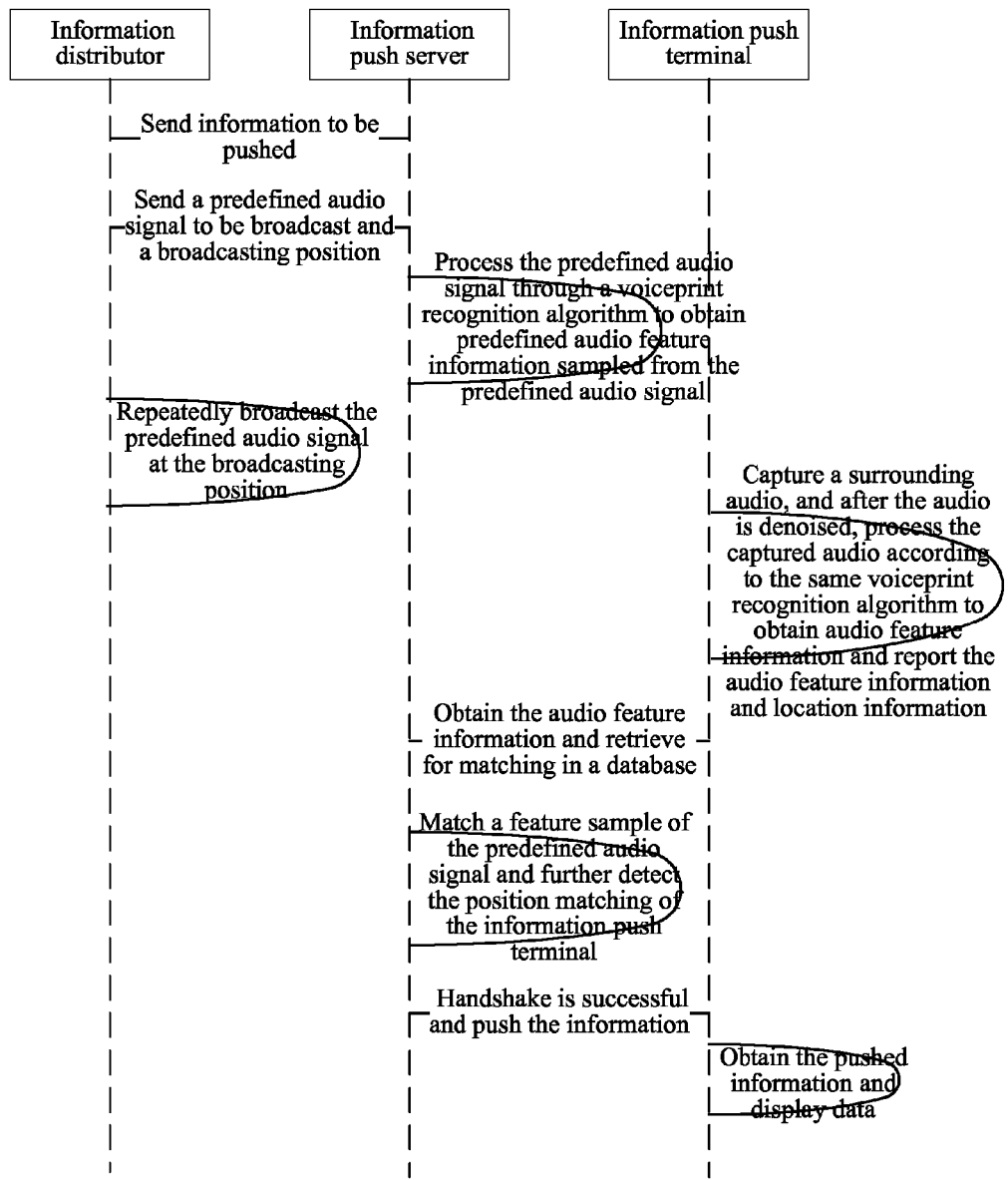
FIG. 13 is a working principle sequence diagram of a first specific embodiment of the information exchanging apparatus, the server and the client device according to the present invention.

FIG. 13 is a working principle sequence diagram of a first specific embodiment of the information exchanging apparatus, the server and the client device according to the present invention.

In this specific embodiment, an information distributor sends information to be pushed to the server in a wired or a wireless manner, and at the same time, sends a predefined audio signal to be broadcast (a low-frequency audio signal with a frequency range of 20 Hz to 10 KHz) and a broadcasting position of the predefined audio signal to the server. The server processes the predefined audio signal through a voiceprint recognition algorithm to obtain sampled sound anchor points (audio feature information) of the predefined audio signal.

The information distributor repeatedly broadcasts the predefined audio signal at a specific broadcasting position.

The client device continuously captures and samples the surrounding low-frequency audio signal, and meanwhile filters background noise by adopting a denoising technology, processes the low-frequency audio signal of 20 Hz to 10 KHz by adopting the same voiceprint recognition algorithm, presents the sampled sound anchor points (the audio feature information) of the surrounding audio, and reports the audio feature information and location information of the client device to the server for matching.

After obtaining the audio feature information, the server retrieves information in a corresponding database. If the sampled sound anchor points of one or more predefined audio signals are matched, if the location of the client device (namely, the position of the user) is matched, and if the position of the user and the broadcasting position of the predefined audio signal are in an allowable error range, handshake is successful, and the server pushes the information to the client device.

The client device obtains and displays the pushed information on a screen, so the entire push procedure is finished.

Figure 14:
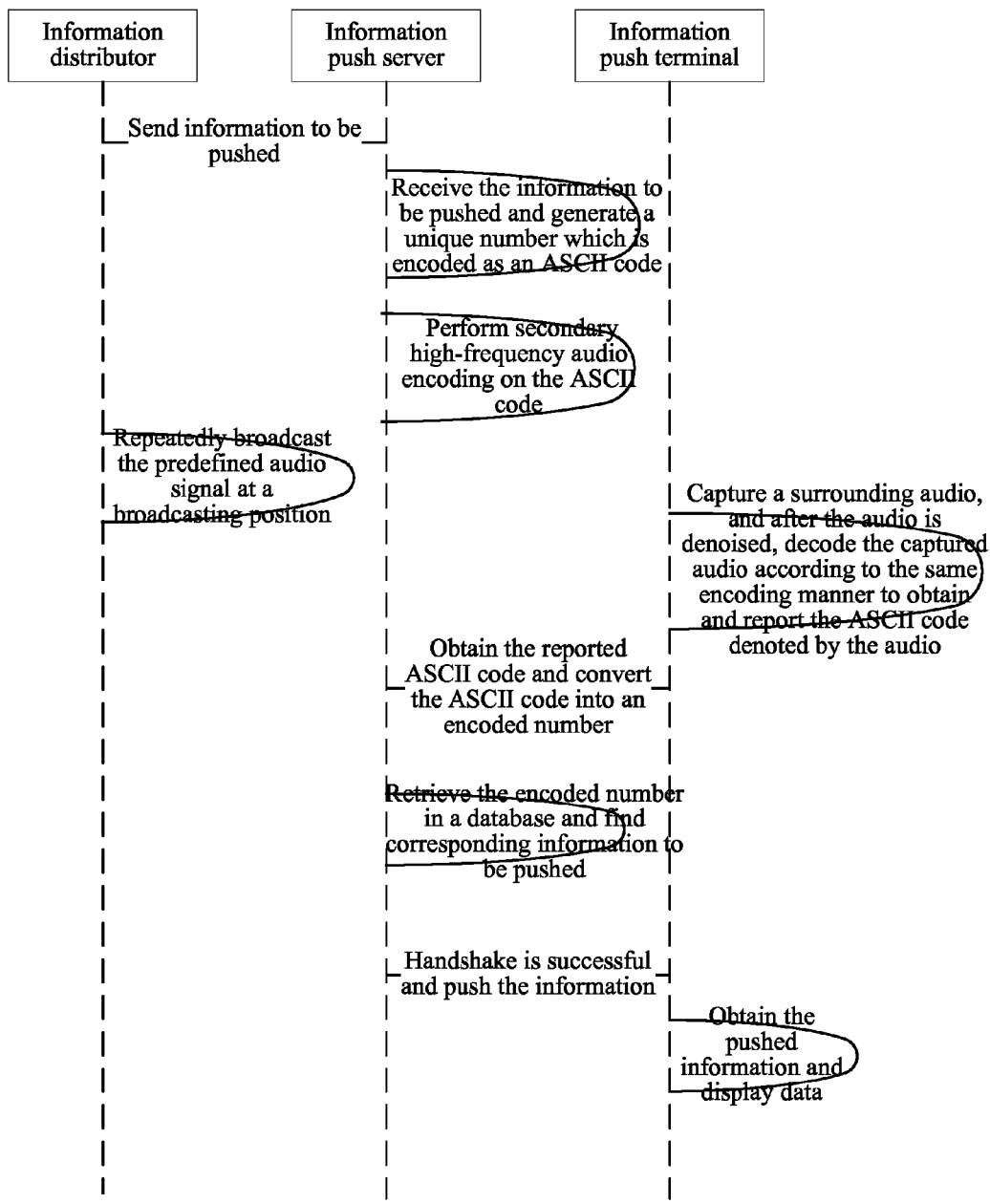
FIG. 14 is a working principle sequence diagram of a second specific embodiment of the information exchanging apparatus, the server and the client device according to the present invention.

FIG. 14 is a working principle sequence diagram of a second specific embodiment of the information exchanging apparatus, the server and the client device according to the present invention.

In this specific embodiment, the information distributor sends information to be pushed to the server in a wired or wireless manner.

The server receives the information to be pushed, generates a unique number (for example, the unique number may be formed by 8 random numbers and letters) according to the information to be pushed, and encodes the unique number as an ASCII code (which is implemented through table look-up). Secondary high-frequency audio encoding is performed on the ASCII code to form a predefined audio signal. An encoding manner may be as follows: the ASCII code of each byte is formed by 3 numbers, and the ten numbers of 0 to 9 respectively correspond to ten frequency bands of 10 K to 19 K (every 1K frequency denotes a number). Thus, if a high-frequency audio of about 0.3 second is used to denote a number, each byte may be denoted by 3 high-frequency syllables in one second, and a complete unique number may be denoted by a group of predefined audio signals with the length of 8 seconds.

The information distributor repeatedly broadcasts the predefined audio signal at a specific broadcast position.

The client device continuously captures and samples the surrounding high-frequency audio signal, and meanwhile filters background noise by adopting a denoising technology. The client device also performs reverse processing on the high-frequency audio signal of 10 KHz to 19 KHz by adopting the same encoding manner, obtains an ASCII code denoted by the surrounding audio or directly obtains an encoded number, and reports the ASCII code or the encoded number to the server for matching.

After directly obtaining the encoded number (or obtaining the encoded number with the ASCII code through table look-up), the server retrieves the encoded number in a database of corresponding encoded numbers. If an unique number is matched accurately, handshake is successful, and the server pushes the information to the client device. The client device obtains and displays the pushed information on a screen, so the entire push procedure is finished.

In this specific embodiment, the high-frequency audio signal of 10 KHz to 19 KHz has already exceeded the main frequency band of common sounds, so the anti-interference capability of audio encoding with the frequency band is strong. Moreover, according to the Nyquist criterion, to ensure accurate information recovery, the sampling rate of a handset of the client device should be set to more than double the highest frequency of the audio signal.

Figure 15:
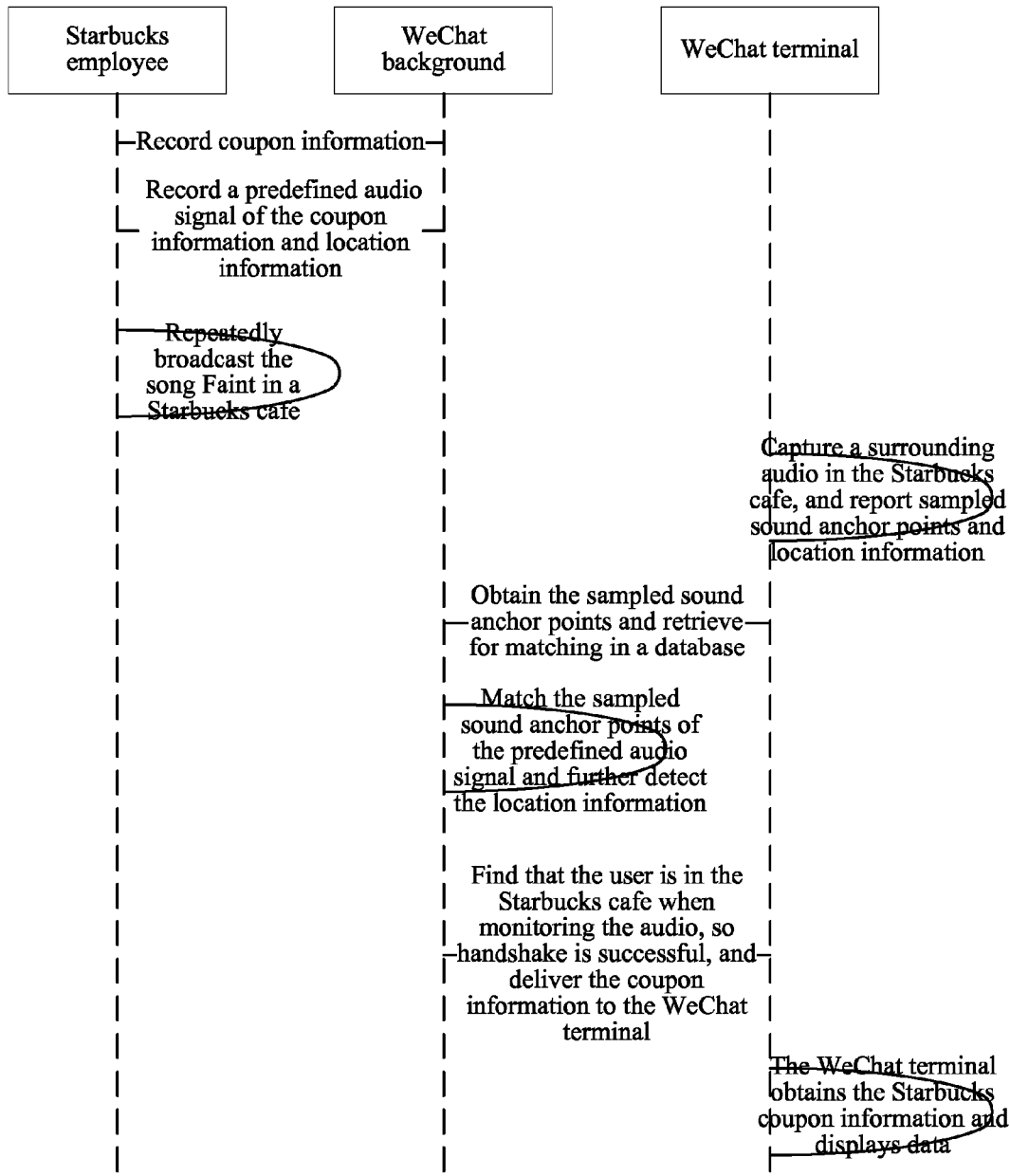
FIG. 15 is a working principle sequence diagram of a third specific embodiment of the information exchanging apparatus, the server and the client device according to the present invention.

FIG. 15 is a working principle sequence diagram of a third specific embodiment of the information exchanging apparatus, the server and the client device according to the present invention.

In this specific example, the information distributor is a STARBUCKS® employee, the server is a WECHAT™ background, and the client device is a WECHAT™ terminal.

First, the STARBUCKS® employee (namely, the information distributor) records a piece of coupon information through the WECHAT™ platform (namely, the server) on the WECHAT™ background (namely, records information to be pushed), adds the song "Faint" of Linkin Park as a predefined audio signal of the coupon information (namely, associates the predefined audio signal with the coupon information), and reports location information of a STARBUCKS® business hall. After the recording is completed, the STARBUCKS® employee broadcasts the song "Faint" at a specified STARBUCKS® cafe.

When consuming at the STARBUCKS®, a user starts the WECHAT™ terminal (namely, the client device) to listen to the surrounding music, reports sampled sound anchor points, and reports his/her location information to the WECHAT™ platform by using, for example, GPS positioning.

When the WECHAT™ terminal captures the song "Faint", the WECHAT™ background matches the sampled sound anchor points, detects that the position of the WECHAT™ terminal is located near the STARBUCKS® cafe, and pushes the STARBUCKS® coupon to the WECHAT™ terminal. The user obtains the coupon and uses the coupon to consume at the STARBUCKS®, and the entire push procedure is finished. If not capturing the song, the WECHAT™ terminal does not return any information or returns information that the retrieval fails.

Figure 16:
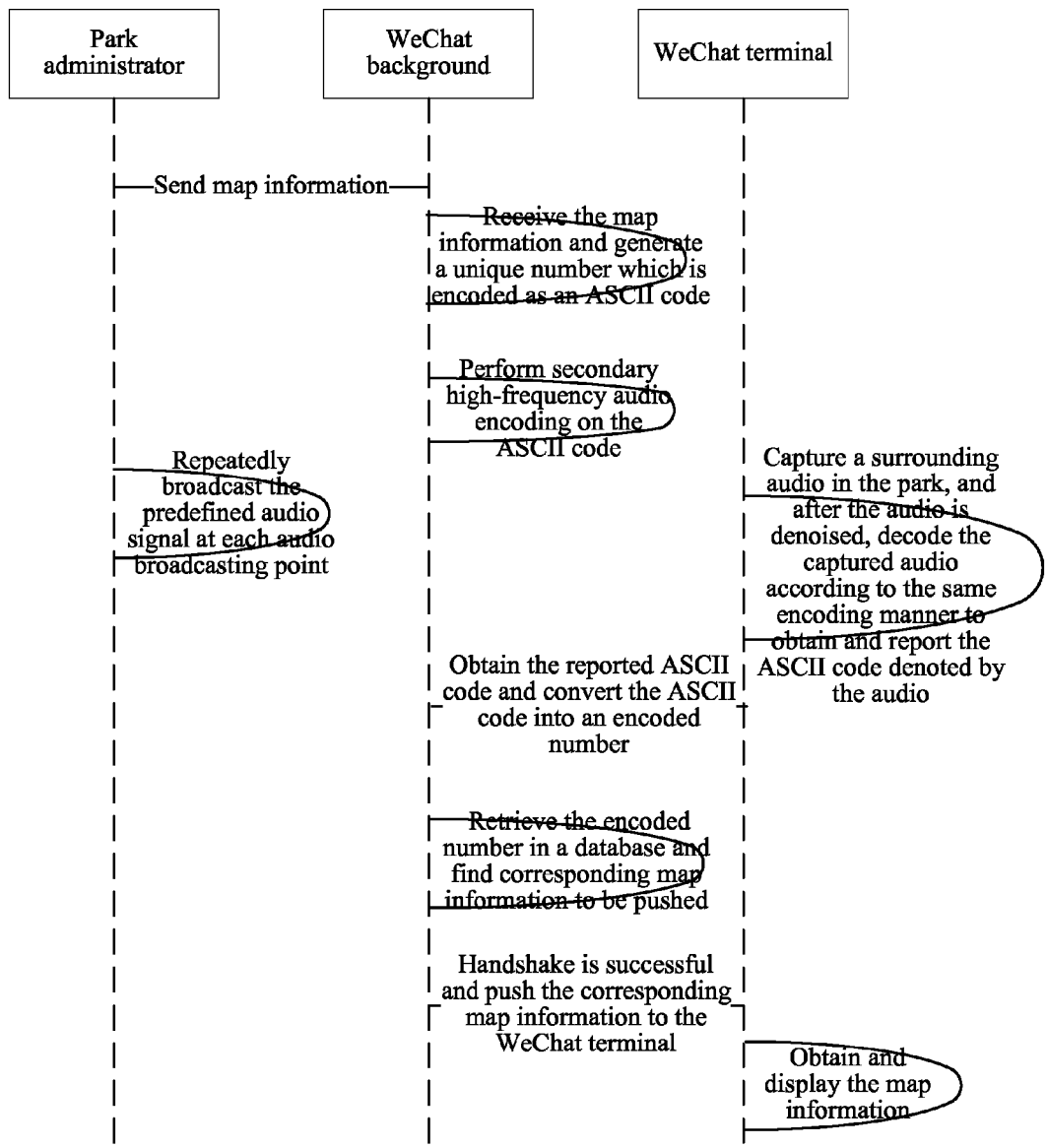
FIG. 16 is a working principle sequence diagram of a fourth specific embodiment of the information exchanging apparatus, the server and the client device according to the present invention.

FIG. 16 is a working principle sequence diagram of a fourth specific embodiment of the information exchanging apparatus, the server and the client device according to the present invention.

In this specific embodiment, the information distributor is a park administrator, the server is a WECHAT™ background, the client device is a WECHAT™ terminal.

First, the park administrator sends map information to the WECHAT™ platform. The WECHAT™ platform receives the map information to be pushed, generates a unique number according to the map information, and encodes the number as an ASCII code.

Secondary high-frequency audio encoding is performed on the ASCII code to form a predefined audio signal. The park administrator repeatedly broadcasts the predefined audio signal at a specific broadcasting position (here, the predefined audio signal may be downloaded from the WECHAT™ platform).

The WECHAT™ terminal in the park continuously captures and samples the surrounding high-frequency audio signal, and filters background noise by adopting a denoising technology, performs reverse processing on the high-frequency audio signal by adopting the same encoding manner, obtains the ASCII code denoted by the surrounding audio or directly obtains an encoded number, and reports the ASCII code or the encoded number to the server for matching.

After directly obtaining the encoded number (or obtaining the encoded number with the ASCII code through table look-up), the WECHAT™ platform retrieves the encoded number in a database of corresponding encoded numbers, and if the corresponding map information to be pushed is found, pushes the map information to the WECHAT™ terminal.

Finally, the WECHAT™ terminal obtains and displays the map information on a screen, so the entire push procedure of the map information is finished.

In addition to the above applications, the server and the client device of the present invention may further be used to push a photo, a business card, a video or a piece of music to a friend according to a surrounding audio signal; or push personal information (such as personal homepage or WECHAT™ number) to others according to an audio signal of self-introduction.

In the information push, receiving and exchanging method, the server, the client device and the information exchanging apparatus of the present invention, information push is performed according to audio feature information of an audio signal, which may implement accurate and efficient information push and improve the information push efficiency. If a low-frequency audio signal is adopted as the predefined audio signal, a dedicated broadcasting source of predefined audio signals does not need to be set, and accurate push of information is implemented through coordination of the location of the client device. If a high-frequency audio signal is adopted as the predefined audio signal, accurate push of information may be implemented only through the identification of the predefined audio signal. Therefore, the technical problem that the existing information push service is low in efficiency, high in cost, and cannot implement accurate push of information is solved.

Those of ordinary skill in the art may make various modifications and improvements without departing from the spirit and scope of the present invention. Therefore, the protection scope of the present invention shall be subject to the appended claims.

While particular embodiments are described above, it will be understood it is not intended to limit the present invention to these particular embodiments. On the contrary, the present invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the present invention herein is for the purpose of describing particular embodiments only and is not intended to be limiting of the present invention. As used in the description of the present invention and the appended claims, the singular forms "a," "an," and "the" are intended to include the plural forms as well, unless the context clearly denotes otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present invention to the precise forms disclosed. Many modifications and variations are possible in view of the above teachings. The embodiments were chosen and described in order to best explain principles of the present invention and its practical applications, to thereby enable others skilled in the art to best utilize the present invention and various embodiments with various modifications as are suited to the particular use contemplated. Embodiments include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of providing information to a prospective user, the method comprising:
    at a server having one or more processors and memory storing programs to be executed by the processors, wherein the server is configured to provide a messaging service to a plurality of users:
        receiving predefined information from a first client device running an application for the messaging service, wherein the predefined information is provided via the application and includes predefined audio feature information corresponding to a predefined audio signal, predefined location information corresponding to a specific location at which the predefined audio signal is scheduled to be broadcasted, and predefined information to be shared;
        after receiving the predefined information from the first client device, receiving audio feature information and location information from a second client device running the application for the messaging service, wherein the audio feature information is extracted from an audio signal received by the second client device and the location information identifies a current location of the second client device, and wherein the audio feature information and the location information are provided via the application;
        comparing the predefined audio feature information with the received audio feature information and comparing the predefined location information with the received location information; and
        pushing the predefined information to be shared to the second client device from the server if there is a match of both comparisons made at the server.

2. The method according to claim 1, wherein the predefined audio signal has a frequency ranging from 20 Hz to 10 KHz.

3. The method according to claim 1, wherein the predefined audio signal has a frequency ranging from 10 KHz to 40 KHz.

4. The method according to claim 1, wherein the predefined audio signal includes the predefined information pushed to the second client device.

5. The method according to claim 4, wherein the predefined audio signal is generated by encoding each byte of the predefined information into an audio signal of a predefined fixed frequency band through a table look-up.

6. The method according to claim 5, wherein the received audio feature information is generated by decoding the audio signal received by the second client device of the predefined fixed frequency band through the table look-up.

7. The method according to claim 1, wherein the audio feature information includes one or more sets of values, each set including a timestamp, a frequency, and a volume derived from a respective segment of the audio signal received by the second client device.

8. The method according to claim 1, wherein the audio signal is repeatedly broadcasted at the specific location.

9. A method of retrieving information directed to a user, the method comprising:
  at a client device having one or more processors and memory storing programs to be executed by the processors, wherein the client device is running an application for a messaging service:
    receiving, by the application, an audio signal broadcasted at a specific location by a broadcasting source;
    extracting, by the application, audio feature information from the received audio signal;
    sending the audio feature information and location information of the client device to a remote server configured to provide the instant messaging service to a plurality of users, wherein:
      the remote server is configured to compare the audio feature information and the location information of the client device with predefined information previously provided to the remote server by a different client device running the messaging service; and
      the predefined information previously provided to the remote server by the different client device includes: (i) predefined audio feature information corresponding to a predefined audio signal, (ii) predefined location information corresponding to a specific location at which the predefined audio signal is scheduled to be broadcasted, and (iii) predefined information to be shared;
    receiving the predefined information to be shared pushed from the remote server, wherein the received information to be shared is chosen by the remote server based on the audio feature information and the location information and the comparison; and
    notifying, by the application, the user of the client device of the received information to be shared.

10. The method according to claim 9, wherein the client device is located within an allowable error range of the broadcasting source and the client device receives the audio signal by recording sounds from the broadcasting source.

11. The method according to claim 9, wherein the client device is configured to extract the audio feature information from the received audio signal by:
  denoising and filtering the received audio signal; and
  extracting one or more sets of values, each set including a timestamp, a frequency, and a volume, from the denoised and filtered audio signal using a voiceprint recognition algorithm.

12. The method according to claim 9, wherein the client device is configured to extract the audio feature information from the received audio signal by:
  denoising and filtering the received audio signal; and
  decoding the denoised and filtered audio signal of a predefined fixed frequency band through a table look-up to obtain the audio feature information.

13. A server that provides a messaging service to a plurality of users, comprising:
  one or more processors;
  memory; and
  programs stored in the memory and to be executed by the one or more processors, the programs including:
    receiving predefined information from a first client device running an application for the messaging service, wherein the predefined information is provided via the application and includes predefined audio feature information corresponding to a predefined audio signal, predefined location information corresponding to a specific location at which the predefined audio signal is scheduled to be broadcasted, and predefined information to be shared;
    after receiving the predefined information from the first client device, receiving audio feature information and location information from a second client device running the application for the messaging service, wherein the audio feature information is extracted from an audio signal received by the second client device and the location information identifies a current location of the second client device, wherein the audio feature information and the location information are provided via the application;
    comparing the predefined audio feature information with the received audio feature information and comparing the predefined location information with the received location information; and
    pushing the predefined information to be shared to the second client device from the server if there is a match of both comparisons made at the server.

14. The server according to claim 13, wherein the predefined audio signal has a frequency ranging from 20 Hz to 10 KHz.

15. The server according to claim 13, wherein the predefined audio signal has a frequency ranging from 10 KHz to 40 KHz.

16. The server according to claim 13, wherein the predefined audio signal includes the predefined information pushed to the second client device.

17. The server according to claim 16, wherein the predefined audio signal is generated by encoding each byte of the predefined information into an audio signal of a predefined fixed frequency band through a table look-up.

18. The server according to claim 17, wherein the received audio feature information is generated by decoding the audio signal received by the second client device of the predefined fixed frequency band through the table look-up.

19. The server according to claim 13, wherein the audio feature information includes one or more sets of values, each set including a timestamp, a frequency, and a volume derived from a respective segment of the audio signal received by the second client device.

* * * * *